United States Patent [19]
Dangat et al.

[11] Patent Number: 6,041,267
[45] Date of Patent: *Mar. 21, 2000

[54] METHOD TO PROVIDE COMMON SUPPORT FOR MULTIPLE TYPES OF SOLVERS FOR MATCHING ASSETS WITH DEMAND IN MICROELECTRONICS MANUFACTURING

[75] Inventors: Geetaram S. Dangat, Naperville, Ill.; Robert J. Milne, Jericho; Robert A. Orzell, Essex Junction, both of Vt.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,753

[22] Filed: Sep. 26, 1997

[51] Int. Cl.[7] ..................................................... G06F 19/00
[52] U.S. Cl. .......................... 700/107; 700/100; 700/105; 700/106
[58] Field of Search ............................... 364/400, 468.01, 364/468.402, 463.13; 395/701, 919; 700/95, 107, 97, 96, 105, 106

[56] References Cited

U.S. PATENT DOCUMENTS

| | | | |
|---|---|---|---|
| 5,260,868 | 11/1993 | Gupta et al. | 364/402 |
| 5,596,502 | 1/1997 | Koski et al. | 364/468.01 |
| 5,787,000 | 6/1998 | Lilly et al. | 364/486.01 |
| 5,796,614 | 8/1998 | Yamada | 364/486.14 |

Primary Examiner—Emmanuel L. Moise
Assistant Examiner—Esaw Abraham
Attorney, Agent, or Firm—Whitham, Curtis & Whitham; Richard M. Kotulak

[57] ABSTRACT

A computer implemented decision support tool serves as a vehicle to enable a user to execute within a common work environment, from common production information files, and at the discretion of the user one of three types of matching between existing assets and demands across multiple manufacturing facilities within boundaries established by manufacturing specifications and process flows and business policies. The tool provides an environment which permits the user to easily gain the advantages of a synergistic relationship between the three types of matching. The tool directly supports three types of matching: (1) material requirements planning (MRP) type of matching, (2) best can do (BCD) type of matching, and (3) projected supply planning (PSP) type of matching.

12 Claims, 7 Drawing Sheets

METHOD TO PROVIDE COMMON SUPPORT FOR MULTIPLE TYPES OF SOLVERS FOR MATCHING ASSETS WITH DEMAND IN MICROELECTRONICS MANUFACTURING

CROSS-REFERENCE TO RELATED APPLICATIONS

This application incorporates by reference the subject matter of U.S. patent applications Ser. No. 08/938,764 filed Sep. 26, 1997, by Yuchung Wong, Xueqing Tang, and John P. O'Neil, for "Projected Supply Planning Matching of Assets with Demand in Microelectronics Manufacturing", Ser. No. 08/926,131, filed Sep. 9, 1997, by Robert A. Orzell, Robert J. Milne, Robert L. Reid, Xueqing Tang, Chih-Kuan Yen, Anand R. Gokhale, Shuchen Li, and G. Dangat, for "Best Can Do Matching of Assets with Demand in Microelectronics Manufacturing", and Ser. No. 08/938,130 filed Sep. 26, 1997, by Robert J. Milne, Robert A. Orzell and Chih-Kuan Yen, for "Advanced Material Requirements Planning Matching Assets with Demand in Microelectronics Manufacturing". The foregoing patent applications are assigned to a common assignee herewith.

DESCRIPTION

BACKGROUND OF THE INVENTION

1. Field of the Invention

The present invention generally relates to computer implemented planning resources and decision support tools and, more particularly, to a tool which provides the user a common data structure and architecture to execute various types of solvers which match assets with demands to support critical business processes in production planning and scheduling.

2. Background Description

Within the complexity of microelectronics and related manufacturing, four related decision areas or tiers can be distinguished based on the time scale of the planning horizon and the apparent width of the opportunity window. To facilitate an understanding of the four decision tiers in semiconductor manufacturing, consider the following oven example, with reference to FIG. 1 which is a diagram associated with this example.

Within a zone of control 10, there is a coater machine 12, a work-in-progress (WIP) queue 14, and an oven set 16. Wafers move around the zone of control in groups of twenty-five, called a lot. All wafers in the lot are the same type. Each lot must pass through the oven operation ten times. Each oven set is composed of four ovens or tubes 161, 162, 163, and 164 and one robot 166 to load and unload the oven. It takes about ten minutes to load or unload an oven. The process time in the oven depends on the iteration. We will assume one lot to an oven at a time. Before a wafer enters into the oven, it must be coated by the coater machine 12. The coating process takes twenty minutes. The coating expires in four hours. If the coating expires, the wafer must be stripped, cleaned, and then recoated. This process takes four hours and often generates yield losses.

The first decision tier, strategic scheduling, is driven by the time frame or lead time required for the business plan, resource acquisition, and new product introduction. This tier can often be viewed in two parts; very long-term and long-term. Here, decision makers are concerned with a set of problems that are three months to seven years into the future. Issues considered include, but are not limited to, what markets they will be in, general availability of tooling and workers, major changes in processes, changes in or risk assessment of demand for existing product, required or expected incremental improvements in the production process, lead times for additional tooling, manpower and planning. In the oven example of FIG. 1, very-long-term decisions are made on whether the ovens are necessary to the production process, and if so the characteristics needed in the ovens. Long-term decisions are made about how many ovens to buy. Tools typically used in planning of this scope are models for capacity planning, cost/pricing, investment optimization, and simulations of key business measures.

The second tier, tactical scheduling, deals with problems the company faces in the next week to six months. Estimates are made of yields, cycle times, and binning percentages. Permissible substitutions are identified. Decisions are made about scheduling starts or releases into the manufacturing line (committing available capacity to new starts). Delivery dates are estimated for firm orders, available "outs" by time buckets are estimated for bulk products, and daily going rates for schedule driven product are set. The order/release plan is generated/regenerated. Reschedules are negotiated with or requested by the ultimate customer. In the oven example of FIG. 1, typical decision areas would include the daily going rate for different products, the allocation of resources between operations, the number of operators to assign, and machine dedication. Tools typically used in the planning and scheduling of this phase are forward schedulers, fast capacity checkers, and optimization of capacity, commits and cost.

The third tier, operational scheduling, deals with the execution and achievement of a weekly plan. Shipments are made. Serviceability levels are measured. Recovery actions are taken. Optimized consumption of capacity and output of product computed. Tools typically used in support of daily activities are decision support, recovery models, prioritization techniques and deterministic forward schedulers. Manufacturing Execution Systems (MES) are used for floor communications and control. In the oven example of FIG. 1, priorities would be placed on each lot arriving at the ovens based on their relevance to the current plan or record. If the ovens "go down", their priority in the repair queue would be set by decisions made in this tier.

The fourth tier, dispatch scheduling or response system, addresses the problems of the next hour to a few weeks by responding to conditions as they emerge in real time and accommodates variances from availability assumed by systems in the plan creation and commitment phases. Essentially, they instruct the operator what to do next to achieve the current goals of manufacturing. Dispatch scheduling decisions concern monitoring and controlling of the actual manufacturing flow or logistics. Here, decisions are made concerning trade-offs between running test lots for a change in an existing product or a new product and running regular manufacturing lots, lot expiration, prioritizing late lots, positioning preventive maintenance downtime, production of similar problems to reduce setup time, downstream needs, simultaneous requests on the same piece of equipment, preferred machines for yield considerations, assigning personnel to machines, covering for absences, and reestablishing steady production flow after a machine has been down. In the oven example, the question should be which lot (if any) should be run next when an oven is free. Tools used are rule based dispatchers, short interval schedulers and mechanical work-in-progress (WIP) limiting constructions.

Of course, there is overlap and interaction between the four decision tiers, but typically different groups are responsible for different scheduling decisions. For example, maintenance may decide on training for their personnel, on work schedules for their people, preventive maintenance, and which machine to repair next. Finance and each building superintendent may make decisions on capital equipment purchases. Industrial Engineering may have the final say on total manpower, but a building superintendent may do the day-to-day scheduling. Marketing may decide when orders for products can be filled and what schedule commitments to make. For strategic and operational decisions, these groups and their associated decision support tools are loosely coordinated or coupled. Finance only requires an estimate of required new tools from each building to estimate capital purchase. Each building requires an estimate on new tool requirements from the product development people. Dispatch decisions must be tightly coupled. Lots only get processed when the appropriate tool, operator, and raw material are available. At dispatch rough estimates are no longer sufficient. If a machine is down maintenance must have the appropriately trained individual available to repair the machine. Manufacturing must have the appropriate mix of tools and workers to produce finished goods on a timely basis. At dispatch the decisions made by various groups must by in synchronization or nothing is produced. A manufacturing facility accommodates this tight coupling in only one of two ways; slack (extra tooling and manpower, long lead times, limited product variation, excess inventory and people, differential quality, brand loyalty, and so forth), or strong information systems to make effective decisions.

Within the first, second and third decision tiers, a major planning activity undertaken by microelectronic firms is matching assets with demands. This activity can be broken into three major types of matching that are used throughout microelectronics to support decision making:

(a) Materials Requirements Planning (MRP) type of matching—"Opportunity Identification" or "Wish list". For a given set of demand and a given asset profile what work needs to be accomplished to meet the demand.

(B) Projected Supply Planning (PSP). Given a set of assets, manufacturing specifications, and business guidelines this application creates an expected or projected supply picture over the next "t" time units. The user supplies guidelines to direct how to flow or flush assets "forward" to some inventory or holding point.

(c) Best Can Do (BCD). Given the current manufacturing condition and a prioritized set of demands which demands can be met in what time frame. BCD generally refers to a large set of demands.

Historically, these three types of matching have been viewed and practiced as distinct and unconnected processes and the solver tools used to support this need have each been unique to the particular type of matching. Furthermore solvers used in each of the tiers to perform similar function were also distinct and unconnected. For example, while tier 1 and tier 2 activities might both require an asset profile of what needs to be done to meet expected demand, the specific solvers used to perform this function were most likely to have been different among the tiers.

Arguably, the oldest type of matching is Material Requirements Planning (MRP). MRP is a system for translating demand for final products into specific raw material and manufacturing activity requirements by exploding demand backwards through the bill of material (BOM) and assets. Many authors have published papers and books on MRP. For example, Joseph Orlickly wrote *Material Requirements Planning*, published by McGraw-Hill, which has become a standard reference. As practiced in the microelectronics industry, MRP systems operate at a specific part number and inventory holding point level of detail.

The difficulty with traditional MRP was it did not provide an estimate about which demand would be met if insufficient resources were available and secondly how to prioritize manufacturing activity in light of insufficient resources. To fill this gap, two general types of tools were developed; (1) tools to examine the output of the MRP solution to help the user identify resource constraints and limited suggestions on how to alter demand, and (2) tools which attempt to create feasible and possibly optimal (or at least "good" or "intelligent") solutions to which demands can be met in what time frame. We will call this class of tool Best Can Do (BCD). In general, both types of BCD tools were provided to users as unconnected processes and tools. The second type of BCD tool often had no or very poor links to the MRP tool runs and often required aggregated data different in level of granularity from the MRP tool. The first type of BCD tool generated such large load levels on the user due to the limited intelligence of the these tools he or she was forced to move to aggregated data to avoid cognitive overload.

The third type of matching is projected supply planning (PSP). Typically, the user would attempt to create reasonable and feasible projected supply plans working with some level of aggregated data. The projected supply plans were then compared against aggregated demand statements to assess the quality of the fit. Dependent on desired presentation viewpoint, these projected supply planning (PSP) tools often used a level of aggregation of different granularity than the MRP. Sometimes such runs would be done with a level of aggregation above the MRP (for example, by using families of part numbers and weekly or monthly time buckets). At other times such runs would include additional detail beyond the standard MRP by planning work center level detail across the supply chain. In either case, results of the PSP were often difficult to link back to a subsequent MRP run. Most are done with electronic spreadsheets with only hand entered data. Some of the more advanced PSP tools were developed in the Application Programming Language (APL) during the early 1980s which provided a rudimentary bridging between the two competing levels of granularity.

Each type of the three types of matching assets with demand described above has its proper role in the world of manufacturing or production planning. Production planners and manufacturing managers responsible for matching have long understood that the three types of matching are not separate and distinct activities but different views of the same core problem. As such, this led to a need to interlink and bridge results from each of these types of matching which was often accomplished through ad hoc processes. Size and scope of the data made all but very limited procedures to link them impossible. Additionally, the need to bridge results from one tier to another was also clearly felt. Again, the size and scope of the data as well as the distinct solvers used by each of these tiers made bridging a difficult task. These difficulties promoted the understanding that business advantages could be gained from a tool which seamlessly supported the three types of matching in a synergistic manner and which could also facilitate the bridging of results from one tier to the next.

SUMMARY OF THE INVENTION

It is therefore an object of the invention to provide a computer implemented decision support tool to enable a user to execute within a common work environment, from common production information files, and at the same level of granularity at the discretion of the user any of three types of matching between existing assets and demands across multiple manufacturing facilities within boundaries established by manufacturing specifications and process flows and business policies.

It is another object of this invention to have each solver of the decision support tool store its solution in the same format.

It is a further object of the invention to facilitate a synergy between multiple, distinct types of matching in a computer implemented decision support tool.

It is a further object of the invention to facilitate bridging among the results of the matching of assets and demands among tier one, two and three processes by using an identical set of solvers to do the matching in each of these tiers.

It is a more specific object of the invention to create a synergy between three distinct decision technologies (MRP, LP, and heuristic) to create a superior solution to the matching requirements problem(s) in microelectronics manufacturing.

It is yet another object of this invention to permit the user to plug and play the components of the computer implemented decision support tool that are required for his or her business situation.

There are two primary business reasons for matching: (a) to determine which demands can be met in what time frame and insuring manufacturing understands the commitments and can incorporate them into their execution systems, and (b) to identify the production and purchases required to meet a specified set of demands. The Matching Assets With Demand (MAWD) tool according to this invention directly supports three types of matching:

(1) Material Requirements Planning (MRP) type of matching—"Opportunity Identification" or "Wish list". For a given set of demand and a given asset profile, determine what work needs to be accomplished to meet demand.

(2) Best Can Do (BCD) type of matching. Given the current manufacturing condition and a prioritized set of demands, determine which demands can be met in what time frame and establish a set of actions or guidelines to insure the delivery commitments are met in a timely fashion. BCD generally refers to large sets of demands.

(3) Projected Supply Planning (PSP) type of matching. Given a set of assets, manufacturing specifications, and business guidelines what is the expected supply picture over the next "t" time units.

Assets include, but are not limited to, starts, WIP (work in progress), inventory, purchases, and capacity (tooling and manpower). Demands include, but are not limited to, firm orders, forecasted orders, and inventory buffer. The matching must take into account manufacturing or production specifications and business guidelines. Manufacturing specifications and process flows include, but are not limited to, build options (BLDOPT), BOM (bill of material), yields, cycle times, receipt dates, capacity available, substitutions, binning or sorting, and shipping times. Business guidelines include, but are not limited to, frozen zones, demand priorities, priority trade-offs, preferred suppliers, and inventory policy. BLDOPT, BOM, yields, cycle times, capacity, substitutions, binning, inventory policy, and supplier preferences are date effective.

According to the invention, the core business function supported by this decision support tool is matching assets with demands and falls into decisions of the first, second and third tiers described above. The invention is the tool which serves as a vehicle to enable a user to execute within a common work environment, from common production information files, and at the same level of granularity at their discretion any of three types of matching between existing assets and demands across multiple manufacturing facilities within the boundaries established by the manufacturing specifications and process flows and business policies. Additionally, the tool provides an environment which permits the user to easily gain the advantages that come from a synergistic relationship between the three types of matching.

Moreover, usage of the same set of solvers to support activities across three tiers facilitates bridging among the results of these different business processes.

The preferred embodiment of the invention has six major components:

(a) Capturing core production planning information from various legacy systems and storing them in a common format that is platform and solver independent.

(b) A core set of "solvers" which match assets against demand in support of a variety of business planning processes, explain how the solution was obtained, and produce answers in a common format that is platform independent. The preferred embodiment has one major solver to support each type of the three types of matching. Within each solver the user has the ability to pick and choose between options and decision technologies. The solvers are referred to as AMRP (Advanced MRP), BCD (Best Can Do), and PSP (Projected Supply Planning).

(c) A common format for storing results from running a solver that all solvers comply with.

(d) Sending results of the solvers to other applications.

(e) A work session manager or environment to enable users to easily use the various components of the planning software as appropriate. Examples of tasks the work session manager must handle are: (i) pulling a subset of the data, editing it, making sand box copies, analyzing the input data, BOM traces; (ii) selecting a solver, running the solver, saving the results, analyzing the solution (queries, reports, graphics, drill down); (iii) saving changed inputs or outputs to central location; and (iv) security of this work activity.

(f) A batch job run facility.

Historically, each type of matching was handled by separate and distinct tools requiring different data formats and different levels of detail. This complete separation of three logically connected tasks creates tremendous problems for planning in the microelectronics industry and eliminates synergy between the tools supporting the three types of matching. Having (1) a common repository of input data and outputs data that is platform and solver independent, (2) all solvers access the same input data in a same format and level of detail and output answers in a common format, and (3) the ability to pick and choose one type of matching within one tool overcomes an age old limitation on tools to support production planners, creates a synergy between the three types of matching and the tools which support them, promotes cross-site communication, supports multiple existing or future manufacturing information data collection systems, insures data integrity, and significantly reduces the resources needed to support multiple solvers required to handle the different types of matching.

The ability of the MAWD tool according to the invention to handle all of the complexities of the semiconductor manufacturing process and the user's ability to choose between any of three matching solvers within an integrated environment insures each manufacturing entity can configure the tool to best meet its requirements.

Bridging between the results of matching assets with demands in each of tiers one, two and three is facilitated by using the same set of solvers across the tiers with different levels of granularity. Communication and bridging among the business process owners of the tiers is improved by (1) a common understanding of business rules and regulators driving the results, (2) common types of inputs to the processes (although the tiers may operate at different levels of granularity), (3) common understanding of the functionality of each of the solvers and (4) common types of output from each of the solvers more easily lending itself to automated comparison.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
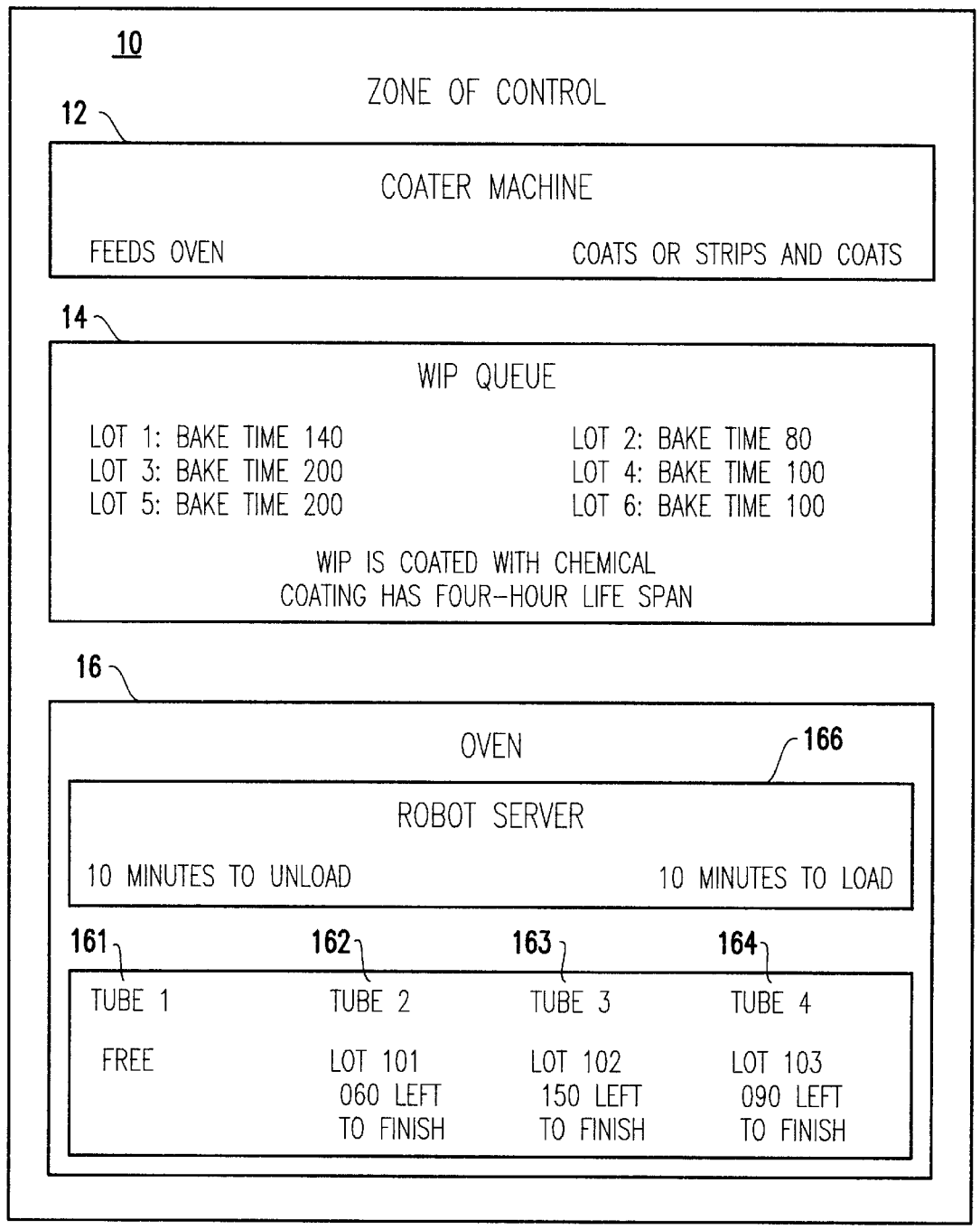
FIG. 1 is a block diagram of an oven dispatch example used to illustrate decision areas or tiers based on a planning horizon.
Figure 2:
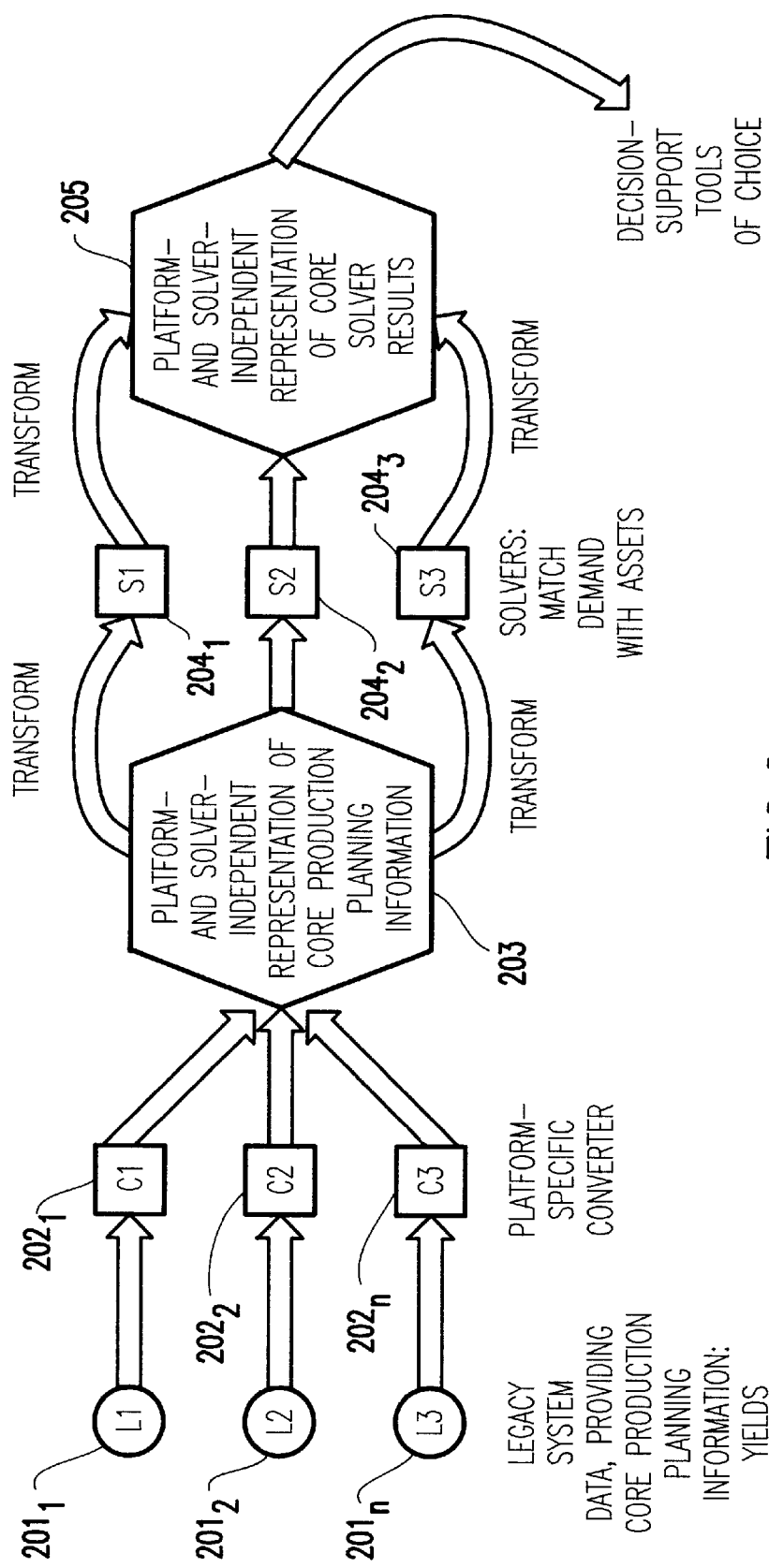
FIG. 2 is a block diagram showing the overall organization of the matching assets with demand (MAWD) decision support tool according to the preferred embodiment of the invention.

Referring again to the drawings, and more particularly to FIG. 2, there is shown a block diagram of the overall organization of the matching assets with demand (MAWD) decision support tool according to a preferred embodiment of the invention. This tool has been implemented to run on a 16-WAY IBM SP2 machine with AFS for storage. The SP2 is a collection of IBM RS6000 engines running under a common umbrella and AIX (IBM's version of the UNIX operating system) and connected with a high speed switch. It could be implemented on other hardware platforms including, but not limited to, minicomputers, stand alone UNIX or Windows NT workstations, or workstations in a network, or mainframes, including IBM AS400 and ES9000 computers.

One of the problems in a typical global manufacturing enterprise is that there are several production facilities in different locations throughout the world. These facilities are characterized by the fact that they were built at different times and therefore have different capacities and efficiencies depending on the installed tool technology base. Moreover, these facilities have different data bases and data structures from which production and distribution information must be derived as to production specification, assets, and business guidelines (BOM, production capacity, yields, and the like). When the production facilities were originally installed, they were essentially autonomous with only minimal coordination of the respective production outputs. Thus, as shown in FIG. 2, there are several "legacy" systems $201_1$ to $201_n$. While only three such "legacy systems are shown, those skilled in the art will recognize that "n" can be any number and, moreover, that these "legacy" systems may be located in diverse countries. The data from these legacy systems must be first converted to a common, independent data base, and this is the function of the several platform-specific converters $202_1$ to $202_n$. Additionally, the same approach will enable legacy systems and the rollout of state of the art applications to co-exist during some transition period. The details of the platform-specific converters are not important to the present invention. It is only necessary that these converters generate a platform independent representation of core production planning information as their output in a data base 203. One skilled in the data processing arts can readily design the converters $202_1$ to $202_n$ given the nature of data from the specific legacy systems.

The data base 203 contains production and distribution information in a common platform and solver independent format. This includes, but is not limited to, manufacturing specifications (BOM, yields, shipping, etc.), asset status (inventory and WIP), distribution requirement (costs, shipping time), business policy (inventory policy, preferred providers, etc.), and demand information. It provides common inputs to each member of the solver suite (solvers $204_1$ to $204_3$). There is one solver for each major type of matching.

The database 205 contains a location for each solver to store its result. All solvers write their solution out in the same format. This database may hold more than one actual solution at a time.

A second common problem in a typical global manufacturing environment is distinct and different tools exist to support each of the three major types of matching that occur on a regular basis in production planning organizations. Each tool has its own separate data format and level of granularity requirements for input and output data and there is little synergy between the tools.

The solver suite, comprising solvers $204_1$ to $204_3$, is a set of solvers which cover all three major types of matching, use the same input data format, and provide outputs in a common data structure 205 and insure the user has easy access to the type of matching the user requires.

The first of the solvers $204_1$ is a collection of material requirements planning (MRP) tools which we collectively refer to as Advanced MRP (AMRP). These tools explode demands into a build plan for purchasing and manufacturing orders. These tools include Mixed MRP which mixes traditional MRP logic flow with dynamically generated linear programming (LP) solutions for binning situations and an LP MRP which mixes LP ability to handle complex bill of materials (BOM) with traditional MRP to identify what must be done when to meet the demand statement independent of constraints.

Details on the preferred embodiment of this solver are disclosed in application Ser. No. 08/938,130. Specifically, application Ser. No. 08/938,130 discloses a computer implemented decision support tool which serves as a solver to generate an advanced material requirements planning (AMRP) match between existing assets and demands across multiple manufacturing facilities within the boundaries established by the manufacturing specifications and process flows and business policies to determine what (and when) to start internally or purchase externally to meet all of the customer demands of current interest. Assets include, but are not limited to, starts, WIP (work in progress), inventory, purchases, and capacity (tooling and manpower). Demands include, but are not limited to, firm orders, forecasted orders, and inventory buffer. The matching takes into account manufacturing or production specifications and business guidelines. Manufacturing specifications and process flows include, but are not limited to, build options (BLDOPT), BOM (bill of material), yields, cycle times, receipt dates, capacity consumed, substitutions, binning or sorting, and shipping times. Business guidelines include, but are not limited to, frozen zones, demand priorities, priority trade-offs, preferred suppliers, and inventory policy. BLDOPT, BOM, yields, cycle times, capacity, substitutions, binning, inventory policy, and supplier preferences are date effective.

To accomplish the task of deciding what to do when to meet customer demand the MRP explodes demands into a build plan for purchased and manufacturing orders for end items as well as components and raw materials necessary to produce those end items. Among the information calculated is (a) recommended future manufacturing starts (planned manufacturing orders), (b) recommended new purchase orders, (c) calculation of "need date" for each WIP lot in the manufacturing line based on when the lot is required to meet customer demand, (d) recommended alterations to purchase orders guided by user set rules, and (e) recommended inter plant shipments in a multisite environment. Within micro-electronics and semiconductor manufacturing, the task of exploding demand and netting against existing assets (WIP and inventory) is made especially difficult due to the complexity of the manufacturing options and processes (production specification structures). Examples of these complexities include, but are not limited to, binning and down grade substitutions, complex substitutions between part numbers, multiple processes within the same manufacturing facility to make the same part, ability of different plants to make the same part, and restrictions on shipments between manufacturing plants.

Traditional MRP explode algorithms do not adequately handle these complexities and as a result significantly overstate the required starts and purchases to meet the customer demands of current interest. To overcome this limitation, the AMRP or MRP tool of application Ser. No. 08/938,130 combines traditional MRP decision technology with linear programming (LP) decision technology to provide both speed and intelligence in the matching process. The additional intelligence significantly reduces the requested starts and purchases by appropriately handling the complexities that arise as part of the normal manufacturing processes in semiconductor and microelectronic manufacturing. The AMRP tool has several major components including (a) a traditional MRP explode algorithm, (b) an LP based explode algorithm which is capable of minimizing the starts required across complex production specification structures (PSS), (c) a separator algorithm which is able to divide the parts and their associated PSS into logically separate or independent groups, (d) a "Meta-Controller" which controls the explode process from start to finish, and (e) post processing routines to combine the information generated into a set of logically coherent tables. The "Meta-Controller" component processes the independent groups in the appropriate order, assigns the correct explode algorithm (traditional or LP based) to each group, and passes the appropriate information from prior groups that have been processed to the group currently being processed.

The second of the solvers $204_2$ is a collection of Best Can Do (BCD) tools which are designed to generate a best can do or intelligent match between existing assets and demands across multiple manufacturing facilities within the boundaries established by the manufacturing specifications and process flows and business policies to determine which demands can be met in what time frame by manufacturing and establish a set of actions or guidelines for manufacturing to incorporate into their manufacturing execution system to insure the delivery commitments are met in a timely fashion.

Details on a preferred embodiment of this solver are disclosed in application Ser. No. 08/926,131. Specifically, application Ser. No. 08/926,131 discloses a BCD solver which provide BCD planners the ability to harness the powerful synergy that can occur by integrating the MRP approach with two direct BCD approaches; one heuristic and one LP. Additionally, it is the first to harness the synergy between an LP solver and a heuristic solver, deploy an LP solver with key enhancements over prior art to adequately represent the complex flows and trade-offs in semiconductor manufacturing, provide a heuristic solver that has a synergistic relationship with the MRP approach, and provide a companion MRP with an imbedded optimization routine to properly handle binned parts and avoid overstating required STARTS (manufacturing activity at the lowest level of the BOM).

The core business function supported by the BCD solver disclosed in application Ser. No. 08/926,131 generates a Best Can Do (BCD) match between existing assets and demands across multiple manufacturing facilities within the boundaries established by the manufacturing specifications and process flows and business policies to determine which demands can be met in what time frame by microelectronics (wafer to card) or related (for example disk drives) manufacturing and establishes a set of actions or guidelines for manufacturing to incorporate into their Manufacturing Execution System (MES) to insure the delivery commitments are met in a timely fashion. The business function of matching assets with demands falls into decisions of the first, second and third tiers described earlier. The solver creates the BCD match.

The preferred embodiment of the BCD solver has six major components: (a) A Material Requirements Planning, explode, or "backwards" component which works backwards from demand through the BOM to establish requirements to meet demand (starts, due dates for receipts, and capacity), minimizes the required starts at the binning operations, and establishes clues for its heuristic implode or forward companion. (b) An optional STARTS evaluator component which examines the required STARTS and establishes an actual STARTS profile to be used by the implode or forward component. STARTS refers to the production activity required to create a part at the "bottom" of the BOM. That is those parts which do not call out another part that is produced by a manufacturing activity. Within the semiconductor manufacturing process this is usually a wafer start. (c) An optional due date for receipts evaluator which examines the differences between current projected dates for receipts and the required date for receipts and establishes a receipts date profile to be used by the implode component. (d) An optional capacity available versus needed activity which examines the differences between current capacity available and the required capacity and establishes a capacity available to be used by the implode component. (e) An implode, "forward", or feasible plan component which generates the best can do match between assets and demands. There are two implode or forward solvers available for the user of the tool. The first one is based on linear programming decision technology. The second one is based on heuristic decision technology. (f) A post processing algorithm which generates a pegging or supply chain analysis report.

The ability of the BCD tool to handle all of the complexities of microelectronics (wafer to card) and related (for example disk drives) manufacturing processes, the synergy between the six components, and the user's ability to choose between the LP based implode solver and the heuristic based implode solver insures each manufacturing entity can configure the tool to best meet their requirements.

The third of the solvers $204_3$ is a Projected Supply Planning (PSP) tool that implodes existing work in progress and specified starts into a projected work and supply plan. This solver provides a "forward flush" using the core MRP base and supports user control over allocation of assets and capacity limitations on production.

Details on a preferred embodiment of this solver are disclosed in application Ser. No. 08/938,764. Specifically, application Ser. No. 08/938,764 discloses PSP matching driven directly by user-supplied guidelines on how to flow or flush assets "forward" to some inventory or holding point. After the supply plan is created, the analyst compares this plan against an expected demand profile. Typically, the demand profile and the supply plan are aggregated both by product type and time buckets for comparison purposes. After the comparison is made, the user can reset the guidelines, alter the START or receipts, and/or modify product specifications (for example, yield or cycle time) and rerun the PSP algorithm to generate a new projected or estimated supply. Historically, PSP tools used very simple and incomplete single-path production-specification information and large time buckets in a grid or tabular format to crudely estimate supply. Additionally, there was no synchronization with the detailed product information used by the MRP tool(s).

The preferred embodiment of the PSP solver has seven major components: (a) A file which contains user guidelines to direct the forward flush or implode of STARTS and WIP through the product structures. The primary guidance required is "from/to." When a part comes to stock, the user must specify what percentage or fraction is allocated to each of the possible paths the part may take next. The fraction is date effective. This tool automatically identifies all user decisions required and simply prompts the user for the fraction or percentage. (b) A mechanism to modify the current WIP or receipts. (c) A mechanism to input STARTS. (d) An implode or "forward-flush" algorithm that generates feasible (capacity and time) plan engine, based on the user-supplied guidelines, the product and distribution information, and the substitution information. (e) A post-processing routine which generates solution explanation reports. (f) A post-processing algorithm that creates an aggregated supply plan. (g) User-selected routines to compare the projected supply with the required demand. The ability of the PSP tool to handle all of the complexities of the semiconductor manufacturing process and the synergy between the components ensures each manufacturing entity can configure the tool to best meet their requirements.

The choice of the solver and the tools selected will depend on several factors including constraints and the user's preference based on empirical use.

While each of the solvers $204_1$ to $204_3$ starts with the same core production planning information from data base 203, they operate as distinctly different solvers employing optionally selected tools. As a result, the solutions generated by the solvers are different. Although different, the solutions are in a common data structure 205 which allows the solutions to be used by other applications at different manufacturing sites.

A critical advance within the MAWD decision support tool of this invention is the ability of the user to move easily between each of the solvers. Four scenarios are provided below to illustrate how the tool may be used to support this concept. They illustrate how different solvers sharing common data input structures and common data output structures may be used in a synergistic manner solve business problems.

Scenario 1

Figure 3:
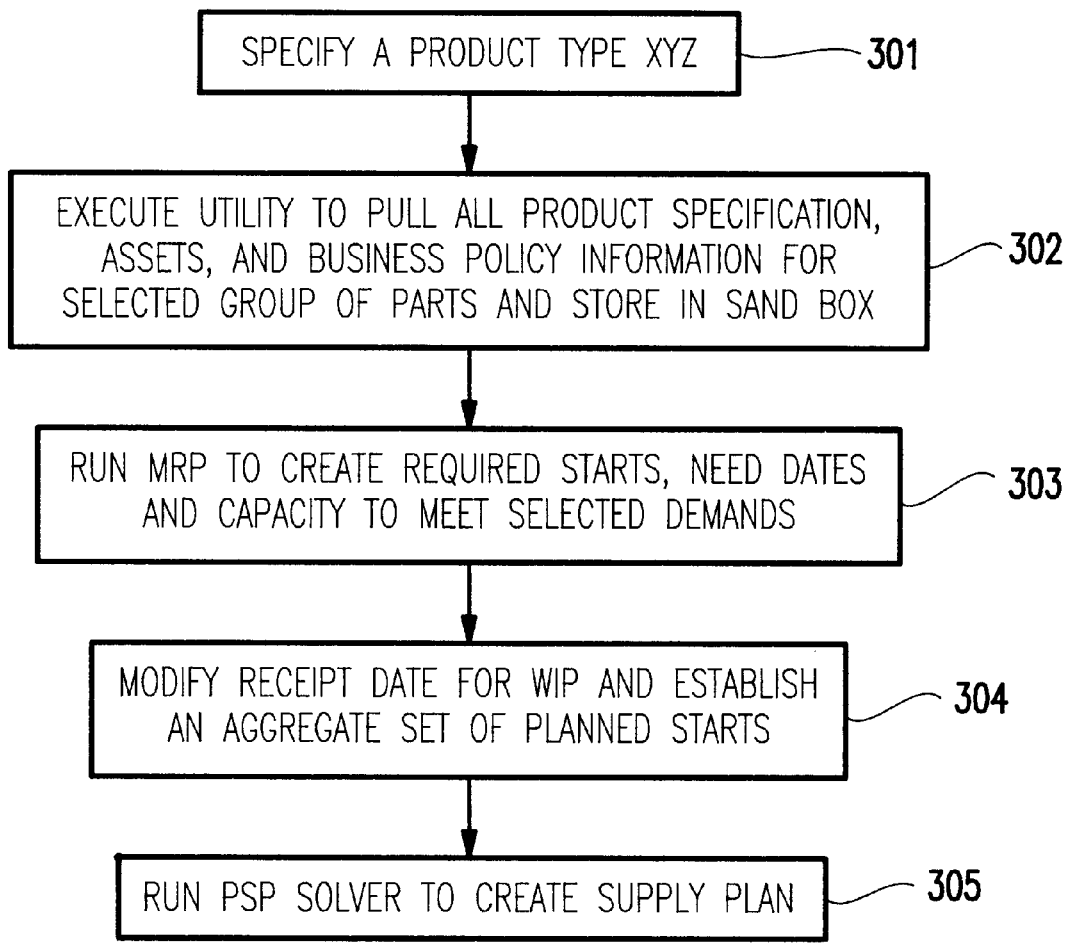
FIG. 3 is a flow diagram depicting the process flow in scenario 1 of a possible use of the MAWD tool by a user.

Referring now to FIG. 3, the user signs onto the MAWD decision support tool and specifies a product type in block 301. A product type refers to a group of part numbers. The product type is generically indicated as "XYZ". The user then selects in block 302 a production specification, business policy, and current asset information for the product type XYZ. He or she then creates a "sandbox" location to store this data for "what-if" analysis. The user executes the MRP solver $204_1$ in block 303 to establish the required starts for a set of demands and need dates for the work in progress. After examining this information he or she modifies some receipt dates and establishes an aggregate start plan in block 304. He or she then executes the PSP solver $204_3$ in block 305 to create a supply plan.

Scenario 2

Figure 4:
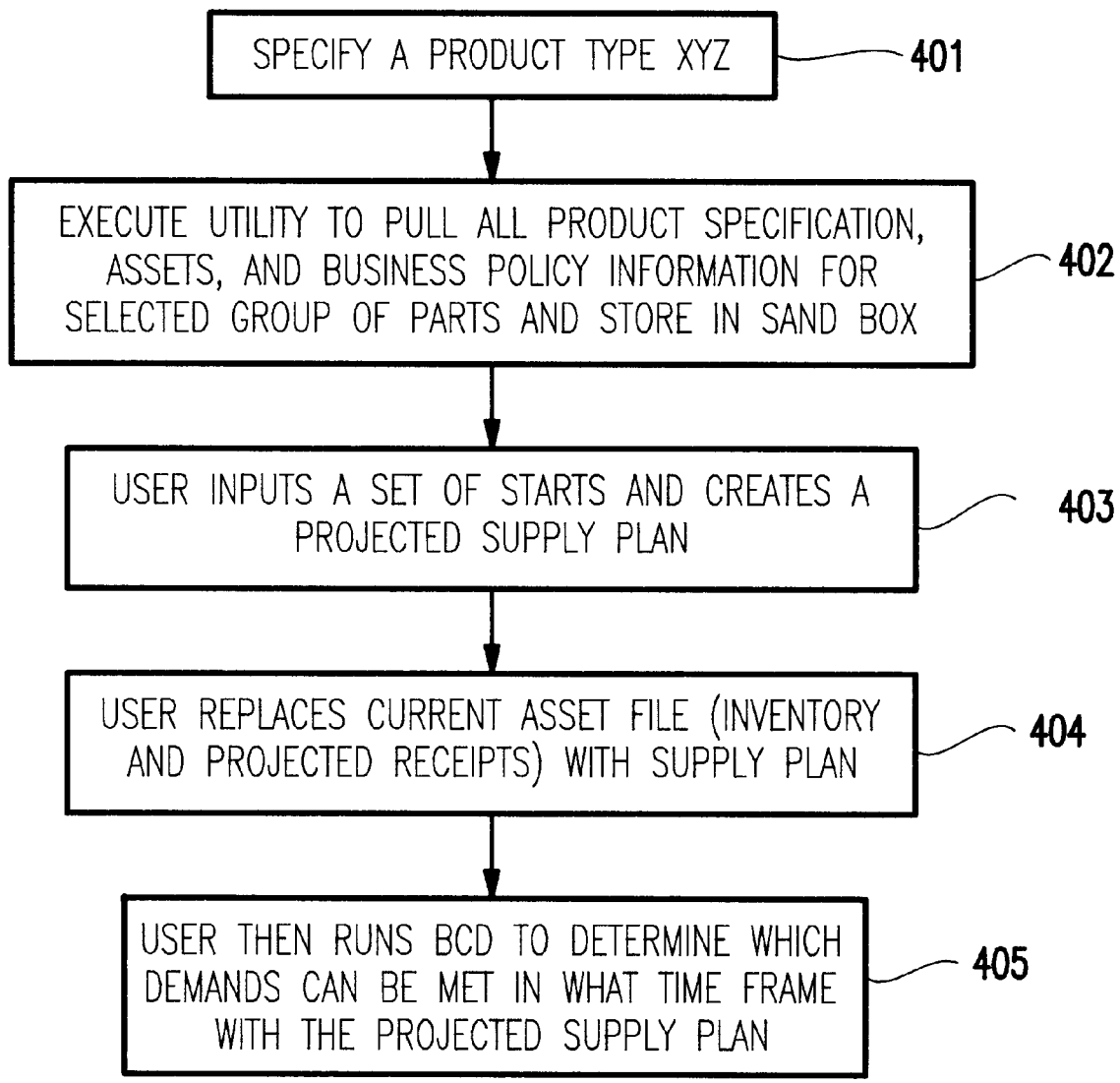
FIG. 4 is a flow diagram depicting the process flow in scenario 2 of a possible use of the MAWD tool by a user.

Referring now to FIG. 4, the user signs onto MAWD decision support tool and specifies a product type XYZ in block 401. The user then selects a production specification, business policy, and current asset information for product type XYZ in block 402. He or she then creates a "sandbox" location to store this data for "what-if" analysis. The user then inputs a set of starts and runs in block 403 to the PSP solver $204_3$ to create a supply plan. In block 404, the user replaces the current WIP file with the projected supply plan. He or she then runs the BCD solver $204_2$ in block 405 with the "replacement WIP or Receipts" file to determine which demands can be met at what time.

Scenario 3

Figure 5:
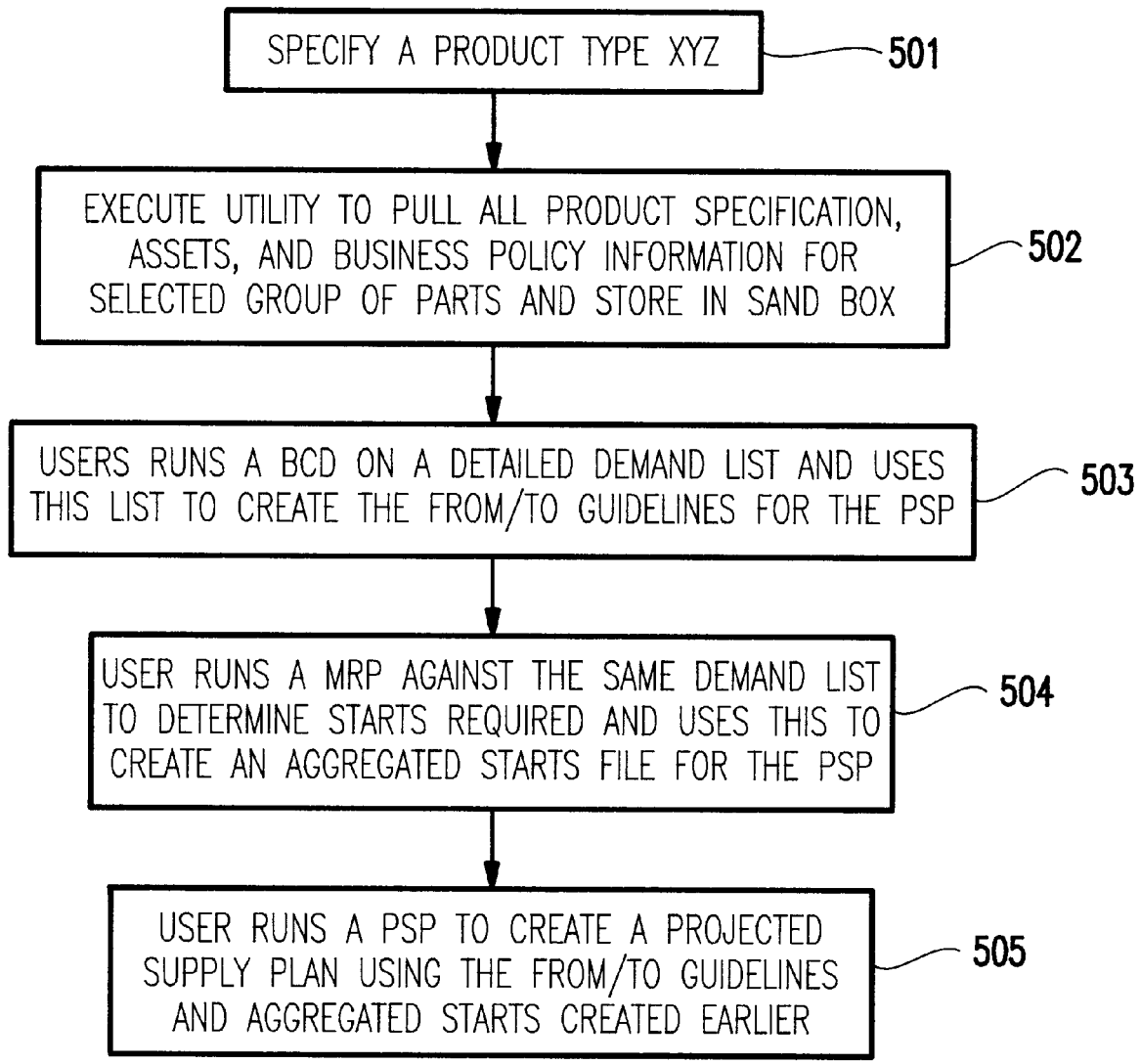
FIG. 5 is a flow diagram depicting the process flow in scenario 3 of a possible use of the MAWD tool by a user.

Referring now to FIG. 5, the user signs onto MAWD decision support tool and specifies a product type XYZ in block 501. The user then selects a production specification, business policy, and current asset information for product type XYZ in block 502. He or she then creates a "sandbox" location to store this data for "what-if" analysis. The user then runs a BCD solver $204_2$ in block 503 on a detailed demand file. The user then analyzes the BCD solution of which demands can be met when to create a set of from/to guidelines to drive the PSP solver $204_3$. The user then runs an MRP on solver $204_1$ in block 504 against the demand statement to obtain a list of required starts. The user then modifies these starts. The user then uses the modified starts and the from/to guidelines and runs the PSP solver $204_3$ in block 505 to create an aggregated projected supply plan.

Scenario 4

Figure 6:
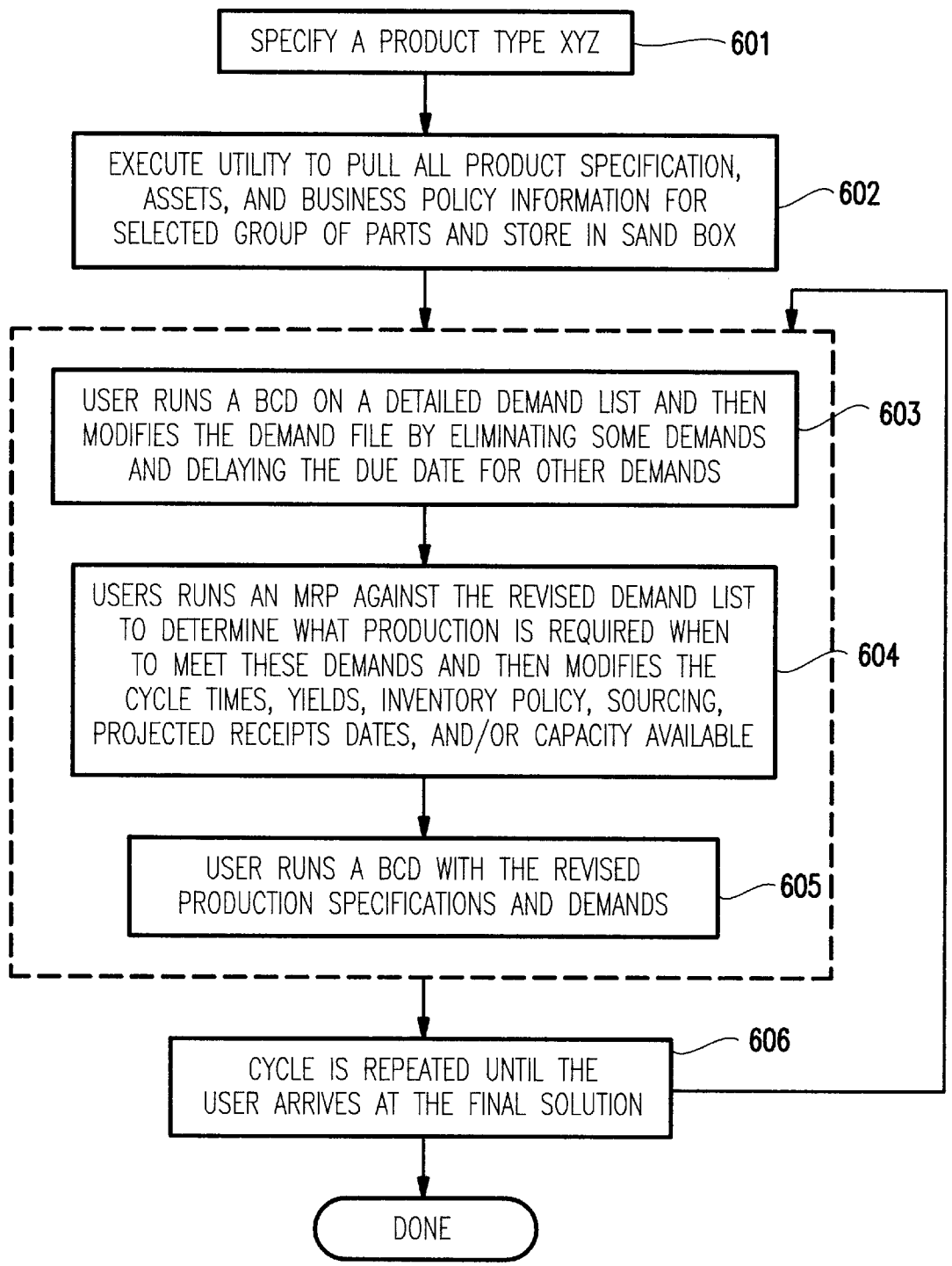
FIG. 6 is a flow diagram depicting the process flow in scenario 4 of a possible use of the MAWD tool by a user.

Referring now to FIG. 6, the user signs onto MAWD decision support tool and specifies a product type XYZ in block 601. The user then selects a production specification, business policy, and current asset information for product type XYZ block 602. He or she then creates a "sandbox" location to store this data for "what-if" analysis. The user then runs the BCD solver $204_2$ in block 603 to determine which demand can met in what time frame. Based on this information, the user modifies the demand file by removing some demand and delaying the required date on others. The user then runs an MRP on solver $204_1$ in block 604 to determine what production activity is required when to meet the revised demand file. Based on this information, the user may modify the cycle times, yields, inventory policy, sourcing preferences, projected receipt date for WIP, and/or capacity available. The user then runs the BCD solver $204_2$ again in block 605 with the revised production specification information and the revised demands. The user repeats this cycle in block 606 until he or she has arrived at the final plan for driving the business.

Figure 7:
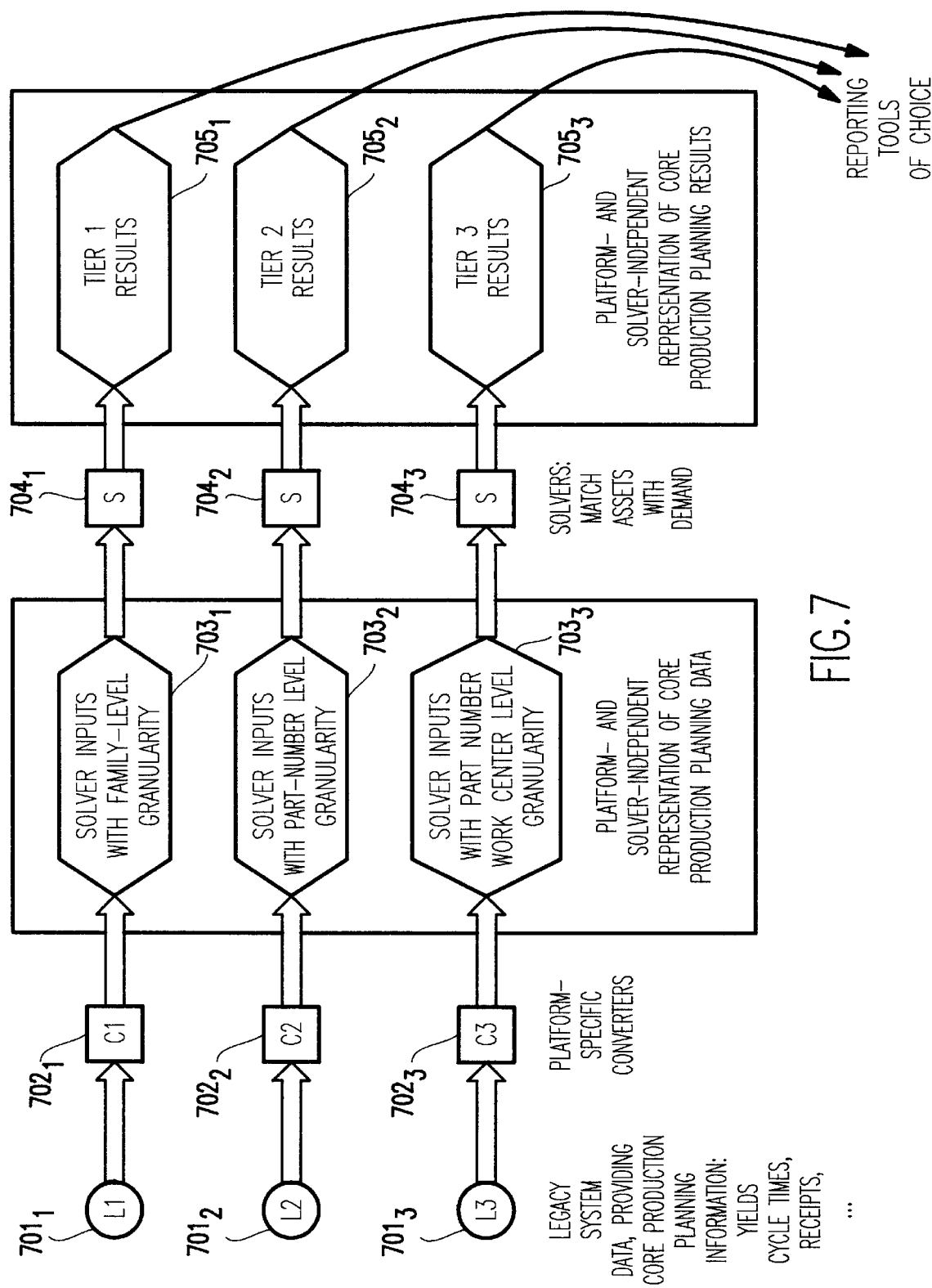
FIG. 7 is a flow diagram depicting the process flow in scenario 5 of an example of bridging the results of a MAWD solver run from a tier one process to a tier two process and from a tier two process to a tier three process.

A different view of the preferred embodiment of the tool is illustrated in FIG. 7. This view is essentially the same as presented in FIG. 2 except the ability of the common input and output data repositories of the tool to support multiple levels of granularity is emphasized. Referring to FIG. 7, blocks $703_1$, $703_2$ and $703_3$ indicate how the common solver input database structure can be used to accommodate family, part number and part number/work center granularity. The main keys for the data elements described as inputs to the solvers may be entities representing families (groups of part numbers), individual part numbers or part number/work center combinations. Similarly, blocks $705_1$, $705_2$ and $705_3$ indicate how the common solver output database structure accommodates output supporting the different business tiers operating at different levels of granularity. Scenario 5 below illustrates how users supporting the different business tiers may use the tool at the level of granularity they require but in a manner facilitating bridging between their results.

Scenario 5

Referring now to FIG. 7, a user supporting tier one decision processes signs on to the MAWD decision support tool in order to determine manufacturing starts to meet projected demand. For tier one decisions, the level of granularity chosen to be used may be at the family level where a family is group of similar types of part numbers. The user arranges for a platform specific converter program to be run in block $702_1$ which pulls data from legacy systems in block $701_1$ and converts the data to family level input data formatted for the MAWD decision tool in block $703_1$. The user runs a specific solver in block $704_1$ and produces results in common solver output format in block $705_1$ which are in turn loaded to a query/reporting system such as DB/2. A second user, this time one who supports tier two business process decisions, signs on to the MAWD decision support tool in order to determine manufacturing starts to meet demand. For tier two decisions, part number level granularity is desired. The user arranges for a platform specific converter to be run in block $702_2$ which pulls data from legacy systems in block $701_2$ and converts the data to part number level input data formatted for the MAWD decision support tool in block $703_2$. The user runs a specific solver in block $704_2$ and produces results in common solver output format in block $705_2$ which are in turn loaded to a query/reporting system such as DB/2. A third user, this time one who supports tier three business process decisions, signs on to the MAWD decision support tool in order to determine manufacturing starts and work center level throughput necessary to meet demand. For tier three decisions, part number/work center level granularity is often desired. The user arranges for a platform specific converter to be run in block $702_3$ which pulls data from legacy systems in block $701_3$ and converts the data to part number/work center level input data formatted for the MAWD decision support tool in block $703_3$. The user runs a specific solver in block $704_3$ and produces results in the common solver output format in block $705_3$ which are in turn loaded to a query/reporting system such as DB/2. In each case, each user executed the same specific solver. While the levels of granularity may have been different, each user used the same types of inputs, used the exact same solver calculation engine and produced the same types of output. A possible scenario may then occur where questions now arise from management as to why the tactical scheduling starts as a result of the tier 2 run appear to be different than the base strategic scheduling run in tier 1. User 1 and user 2 get together to do an analysis. Both users are confident that any differences that may have arisen were not due to artifacts caused by using different solvers as they both used the same solver. As both runs produced a common type of output, the users use a query tool on this output to compare the results of both runs. They direct the query tool to use a part number to family mapping table to bring the results of the two runs to the same level of granularity for comparison purposes. Differences are detected. As both users use the same types of inputs and have the same understanding of the solver calculations, differences in input data between the two runs are analyzed and found. Similarly, user 2 and user 3 can get together to analyze differences between the tactical scheduling run created by the tier 2 user and the operational scheduling run performed by the tier 3 user.

The invention described is a computer implemented decision support method which matches assets with demand and is based upon the user iteratively selecting among the following methods:

(a) A Best Can Do (BCD) method as particularly described in application Ser. No. 08/926,131;

(b) A Projected Supply Planning (PSP) method as particularly described in application Ser. No. 08/938,764; and (c) An Advanced Material Requirements Planning (AMRP) method as particularly described in application Ser. No. 08/938,130.

Having thus described our invention, what we claim as new and desire to secure by Letters Patent is as follows:

1. A computer implemented decision support method which matches assets with demands to determine which demands can be met in what time frame, identifies production activities necessary to meet the demand, and creates a projected supply plan to generate different outputs for use in generating a production plan, comprising the steps of:

establishing a first comprehensive detailed data base to represent and store production specification information that includes manufacturing specifications, asset status, and business guidelines;

establishing a second comprehensive detailed data base to represent and store matching solutions including all required manufacturing activities, their quantity, and their start date, wherein the solutions are produced by iteratively selecting and running any of a set of solvers;

capturing and storing core production specification information from various sources and storing them in said first comprehensive detailed data base in a single format and level of detail;

specifying initial production specification information from said first comprehensive detailed data base;

iteratively selecting and running one or more of said set of solvers based upon examination of previous iteration results, said set of solvers commonly accessing the initially specified or a newly specified production specification information from said first comprehensive detailed data base, said set of solvers including: Advanced Material Requirements Planning (AMRP) that uses a series of integrated Linear Programming and MRP methods to explode demand backwards through a bill of material and assets across multiple manufacturing facilities, Best Can Do (BCD) that matches demand against manufacturing capability across a bill of material supply chain and indicates when end item customer demand is satisfied, and Projected Supply Planning (PSP) that executes a forward flush of starts and work in progress and compares projected supply with demand;

generating different outputs based on said iteratively selecting and running step for each solver; and determining a production plan based on one or more of the different outputs generated by said iteratively selecting and running step, wherein the different outputs of said set of solvers and said production plan are stored in common data areas of said second comprehensive detailed data base in a common format that is accessible by other solvers and other applications.

2. The computer implemented decision support method recited in claim 1 wherein the step of selectively running solvers comprises the step of selecting the Advanced Material Requirements Planning (AMRP) solver to explode demands into a build plan for purchasing and manufacturing orders.

3. The computer implemented decision support method recited in claim 1 wherein the step of selectively running solvers comprises the step of selecting the Best Can Do (BCD) solver to match assets with demand.

4. The computer implemented decision support method recited in claim 1 wherein the step of selectively running solvers comprises the step of selecting the Projected Supply Planning (PSP) solver to implode existing work in progress and specified starts into a projected work and supply plan.

5. The computer implemented decision support method recited in claim 1 wherein the step of selectively running solvers comprises the steps of:

selecting the Advanced Material Requirements Planning (AMRP) solver to explode demands into a build plan for purchasing and manufacturing orders; and selecting the Best Can Do (BCD) solver to match assets with demand.

6. The computer implemented decision support method recited in claim 1 wherein the step of selectively running solvers comprises the steps of:

selecting the Best Can Do (BCD) solver to match assets with demand; and selecting the Projected Supply Planning (PSP) solver to implode existing work in progress and specified starts into a projected work and supply plan.

7. The computer implemented decision support method recited in claim 1 wherein the step of selectively running solvers comprises the steps of:

selecting the Advanced Material Requirements Planning (AMRP) solver to explode demands into a build plan for purchasing and manufacturing orders; and selecting the Best Can Do (BCD) solver to match assets with demand; and selecting the Projected Supply Planning (PSP) solver to implode existing work in progress and specified starts into a projected work and supply plan.

8. The computer implemented decision support method recited in claim 1 wherein the step of selectively running solvers permits a user to mix and match a sequence of solver runs to address a business question of concern.

9. The computer implemented decision support method recited in claim 1 wherein the decision support method is used in a first decision tier, strategic scheduling, a second decision tier, tactical scheduling, and a third decision tier, operational scheduling, and wherein the identical set of solvers is used to support first, second and third decision tier processes.

10. The computer implemented decision support method recited in claim 1 wherein the various sources of core production specification information are from a plurality of facilities using different data bases and wherein the step of capturing and storing core production specification information from the various sources comprises the step of converting production specification information from each of several data bases to an independent data base of common format.

11. The computer implemented decision support method recited in claim 10 wherein the step of selectively running solvers permits a user to mix and match a sequence of solver runs to address a business question of concern which includes all said plurality of facilities.

12. The computer implemented decision support method recited in claim 10 wherein the independent data base common format accommodates differing levels of granularity as appropriate to support each of the first, second and third decision support tiers.

* * * * *